July 3, 1934. W. L. COOK 1,964,871
UNPROTECTED CABLE TERMINAL
Filed June 4, 1931 2 Sheets-Sheet 1
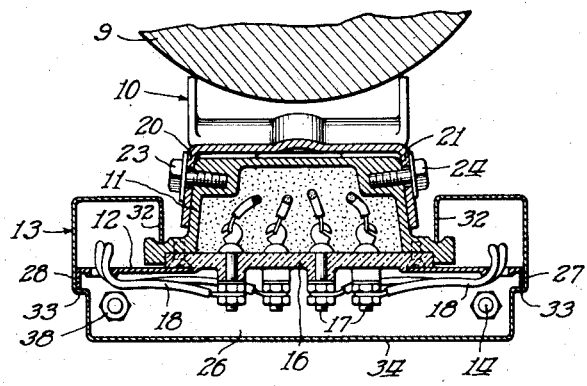
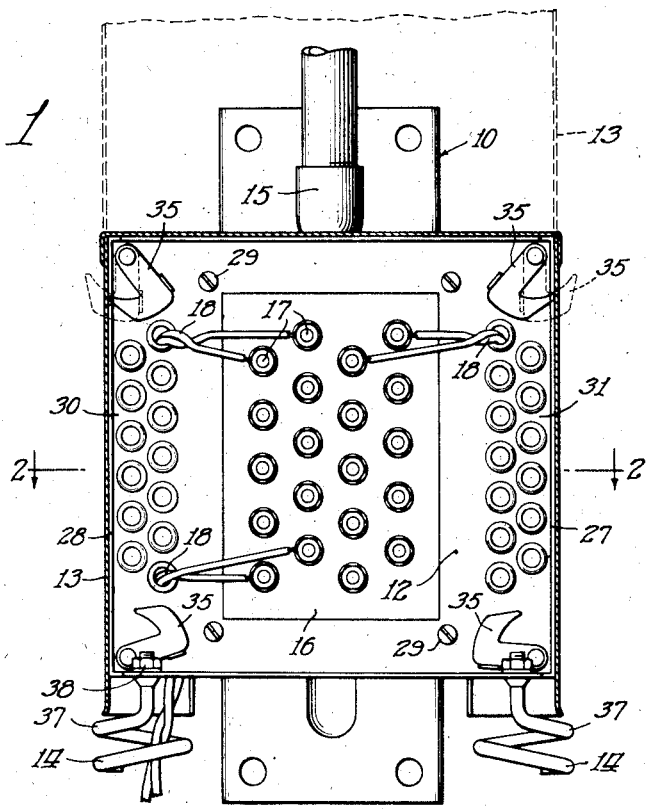
Inventor
Wallace L. Cook
By Zabel & Banning
Attys.

July 3, 1934.　　　　W. L. COOK　　　　1,964,871
UNPROTECTED CABLE TERMINAL
Filed June 4, 1931　　　2 Sheets-Sheet 2
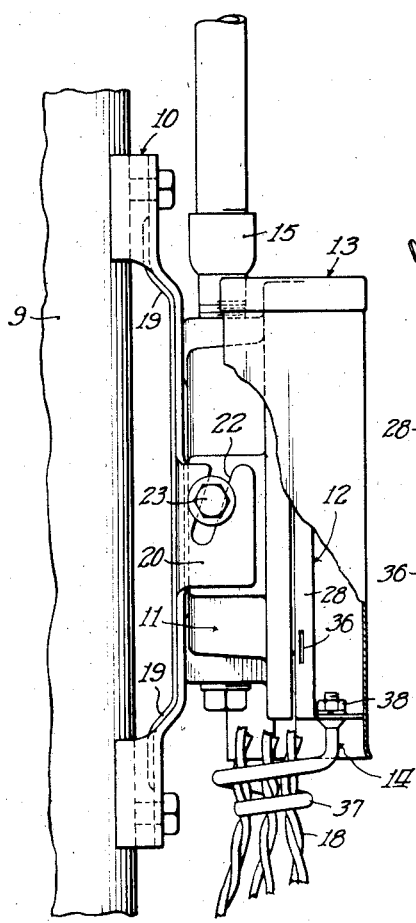
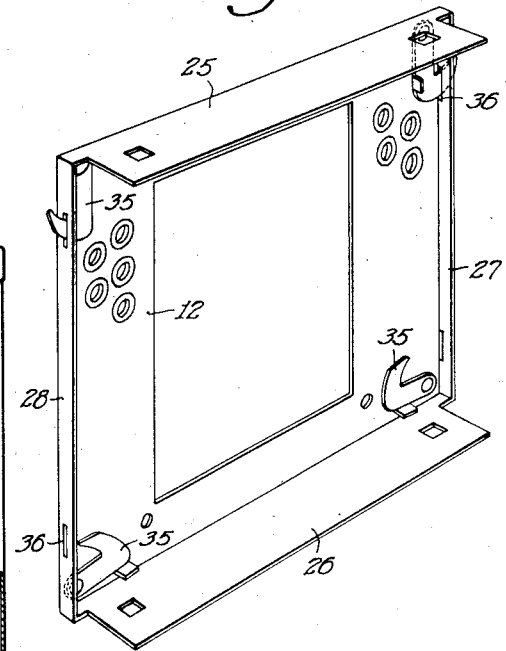
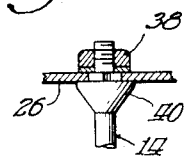
Inventor
Wallace L. Cook
By Zabel & Banning
Attys.

Patented July 3, 1934

1,964,871

UNITED STATES PATENT OFFICE 1,964,871

UNPROTECTED CABLE TERMINAL

Wallace L. Cook, Chicago, Ill., assignor to Reliable Electric Company, Chicago, Ill., a corporation of Illinois Application June 4, 1931, Serial No. 542,022

15 Claims. (Cl. 247—7)

My invention relates to cable terminal boxes, such as are commonly used as terminals for lead covered aerial cables, such for example as telephone cables.

In terminals of this character a long life of the sealing chamber portion is desirable, since if the sealing chamber receiving the leads from the cable deteriorates before it is desired to change the cable, considerable expense is incurred.

Since most of these devices are also mounted on a pole, they are much more convenient to handle if they are made light. Some have been made of all sheet metal, but such structures are prone to rust or otherwise quickly deteriorate and destroy the sealing chamber. If made entirely of heavy casting, the weight is such that the terminal boxes are very difficult to handle and expensive to manufacture.

My invention embodies means including a combination of heavy casting for the sealing chamber itself and a lighter sheet material for the remainder of the construction which may be replaced without serious inconvenience.

My invention also contemplates as one of the objects thereof a new type of fanning strip or plate structure which in cooperation with the sealing chamber forms a more simple and accessible construction.

My invention also contemplates the provision with the improved fanning plate structure of a cover which substantially seals or encloses that portion of the box where the exposed wiring terminals are located as well as sheltering the openings in the fanning plate.

Cable terminals such as those shown in Patent No. 857,341 have openings for individual pairs of wires through the back of the box into the closed binding post chamber. Cable terminals such as shown in Patent No. 1,660,815, to Persons, have openings for groups of bridle wires through the bottom of the box into the closed binding post chamber. Snow and rain, as well as dirt, gain access to such terminals, and when lodged on the face plate reduce surface insulation and cause interruption to service.

In my cable terminal there is no opening into the binding post chamber excepting the small openings in the fanning plate and these are effectively shielded by the form of cover used.

It is common practice for the cable to enter the terminal at top or bottom whichever is nearest the cable lead. My terminal may be reversed end for end without affecting its serviceability.

My invention utilizes the well known principle of a separate mounting bracket. The bracket is slotted in such a way that the terminal is wedged against the bracket as it is lowered into the slots.

It has been the practice to chain or hinge the cover to the cable terminal. Where a chain has been depended upon it has been necessary to locate the cable terminal in a position that would leave enough clearance above the terminal box to allow the cover to be removed and leave enough clear space below it for the cover to hang without interfering with wires.

My invention contemplates a reversible terminal with means for holding the cover in a raised position, which gives free access to the terminal binding posts and fanning plate, and requires less space for mounting than a terminal with cover held by a chain.

It has been the practice to mount three bridle rings on the pole below the cable terminal to neatly dispose of slack which may be needed if it is necessary to change a pair of wires from one cable pair to another, that is, from one pair of terminal posts to another. My invention contemplates a reversible cable terminal with two bridle rings mounted upon it thereby making it more convenient to leave slack in the drop wires.

Other advantages and objects of the invention will appear as the description proceeds when taken in connection with the accompanying drawings. It is to be understood, however, that the description and drawings are illustrative only and are not to be considered as limiting the invention except in so far as it is limited by the claims.

In the drawings—

Fig. 1 is a front view showing the cover of the terminal box in section;

Fig. 2 is a section on the line 2—2 of Fig. 1;

Fig. 3 is a side view partly in section of the terminal box as mounted upon a support;

Fig. 4 is a perspective view of the fanning plate structure used; and

Fig. 5 is a detail view of the mounting of one of the bridle rings upon the fanning plate.

Referring now in detail to the drawings, the structure consists essentially of a bracket 10 to be mounted upon a suitable support 9, such as a pole, a sealing chamber 11, a face plate 16, a fanning plate 12, a cover 13, and suitable bridle rings 14. It is in the cooperation of the features of these elements that the present invention resides.

The sealing chamber 11 may be filled with any suitable insulating material, and the cable will enter through the nipple 15 at one end of the sealing chamber. The sealing chamber walls with the exception of the face plate are preferably made of cast gray iron having a high resistance to deterioration due to weathering or rust. The face plate 16 may be affixed to the casting by any suitable means such as screws and is preferably made of some sort of insulating material such as the synthetic resin compounds now widely used for insulation.

The cable wires and the outside leads are connected to the binding posts 17 in the usual manner. The bracket 10, it will be noted, is bowed or offset as indicated at 19 so as to have the central portion projecting away from the support while the two ends may be secured to the support in some suitable manner. On the sides of the bowed portion 19, there are provided a pair of upstanding flanges 20 and 21, which flanges are slotted as indicated at 22. (See Fig. 3.) For the purpose of mounting upon the bracket, the sealing chamber is screw-threaded to receive the screw bolts 23 and 24, which screw bolts fit into the slots 22.

The offsets in the bracket space the terminal receiving portion away from the heads of the bracket mounting lag screws. This makes it unnecessary to have more than one size bracket for several sizes of terminal boxes whether they be longer than the bracket or not, and, moreover, it permits ready reversal of the terminal boxes end for end depending upon whether the cable is to come down from the top or up from the bottom. The construction is such that the terminal box and fanning plate may readily be reversed with respect to the cover by the simple expedient of attaching the bridle rings to the opposite end from their original position.

The fanning strip or plate structure consists in the present instance of a flat plate 12, preferably of sheet steel, which plate has the top and bottom ends 25 and 26 turned up into flanges projecting forwardly from the plate surface. Small ribs 27 and 28 also extend along the side edges of the plate 12. This plate 12 is removably mounted upon the face plate by suitable screws as indicated at 29 in Fig. 1 so that, in case of deterioration or destruction in other manners, it can readily be replaced without disturbing the sealing chamber.

The features of this fanning plate are of considerable importance in the present structure.

It will be noted that the fanning plate has the laterally extending apertured portions at 30 and 31 through which the pairs of wires 18 enter from the back for connection to the wiring terminals 17. Thus, both sides are open to receive wires, and a greater amount of space and freedom is allowed which facilitates connecting up the terminals.

When the cover is in closed position the terminal posts are accessible only by way of the space at the bottom of the cover, thence through the apertures in the fanning plate and around another right angle to the terminal posts. This devious route minimizes the likelihood of snow or rain blowing onto the face plate and causing leakage of current and consequent service interruption.

The fanning plate also cooperates with the sealing chamber structure to form a guide for the cover 13, and prevent it from tilting into the binding posts. It will be noted that at the back the flanges 32 are guided by the laterally projecting side edges of the sealing chamber casting. The flange portions 27 and 28 cooperate with the offset portions 33 of the cover to complete the guiding structure for the cover which facilitates ready application of the cover to the terminal box regardless of which end it is started from. The front of the cover at 34 preferably makes a close fit with the flanges 25 and 26.

Now in order to hold the cover out of the way, for example when the wiring up of the terminal box is being done, the supporting hooks 35 are provided. These hooks are placed at all corners of the fanning plate, and the flanges 27 and 28 are cut away as indicated at 36 in Figs. 3 and 4 to permit the hooks to pass through and engage the cover and hold it in elevated position as shown by the dotted line in Fig. 1.

The bridle ring mounting is preferably that shown in Figs. 1—4. The rings 37 pass inwardly through a square hole in the end flange of the fanning plate. Suitable nuts such as indicated at 38 may be used to hold them in place. It will be noted from Fig. 4 that these bridle rings may be attached to either flange 25 or flange 26. It is also clear from Fig. 1 and Fig. 3 that this type of mounting insures the bridle rings being properly positioned to hold the wires out of the way of the cover and facilitates the application of the cover to the box. In Fig. 5 I have shown a detail of the bridle ring structure. As shown, the end of the bridle ring wire is upset at 40 and passed through the square opening in the flange and held in place by a suitable nut 38.

From the above description, it is believed that the structure and advantages of this device will be clear to those skilled in this art.

Having thus described my invention, what I claim as new and desire to secure by Letters Patent is:

1. A cable terminal box embodying a sealing chamber, a face plate therefor, a fanning plate having apertured portions parallel with and extending laterally from opposite side edges of the face plate and a cover substantially enclosing said fanning plate, said terminal box and fanning plate being reversible together end for end with respect to said cover.

2. A cable terminal box having a sealing chamber, a flat fanning plate having upper and lower end portions projecting forwardly from the plate, a cover slidable endwise over said fanning plate and having offset side walls cooperating with said fanning plate to guide said cover in its sliding movement.

3. A cable terminal comprising a sealing chamber, fanning strip means thereon, the wire receiving portions of which project parallel with the front of said chamber, a removable cover enclosing said portions and also forming a front wall for said terminal and means on said portions guiding said cover on and off said terminal.

4. A cable terminal comprising a sealing chamber, fanning strip means thereon, the wire receiving portions of which project parallel with the front of said chamber, a removable cover enclosing said portions and also forming a front wall for said terminal, and said fanning means having latch means for holding said cover in raised position to expose said portions.

5. A cable terminal comprising a sealing chamber, fanning strip means thereon, the wire receiving portions of which project parallel with the front of said chamber, a sliding removable cover enclosing said portions and also forming a front wall for said terminal, and said means having a forwardly extending bottom flange to cooperate with said cover in completing the enclosure.

6. A cable terminal comprising a sealing chamber, fanning strip means thereon, the wire receiving portions of which project parallel with the front of said chamber, a sliding removable cover enclosing said portions and also forming a front wall for said terminal, and flanges on said portions guiding said cover on and off said terminal, said fanning means having latch means for holding said cover in raised position to expose said portions.

7. A cable terminal comprising a sealing chamber, fanning strip means thereon, the wire receiving portions of which project parallel with the front of said chamber, a sliding removable cover enclosing said portions and forming a front wall for said terminal, and flanges on said portions guiding said cover on and off said terminal, said means having a forwardly extending bottom flange to cooperate with said cover in completing the enclosure.

8. A cable terminal structure comprising in combination, a mounting bracket, a cable terminal body having a sealing chamber and fanning strip means, a cover for said terminal body, and bridle rings carried by said terminal body, said terminal body being reversible on said bracket and said cover and bridle rings being reversible relative to said terminal body.

9. A cable terminal box, mounting means therefor, means on said box and mounting means securing said box on its mounting means with either end up or down, and bridle rings mountable on either end of said terminal box.

10. A cable terminal box including a sealing chamber having a back wall or housing and a face plate, a fanning plate extending laterally from said face plate, a cover extending over the front of said fanning plate and face plate and having portions cooperating with said back wall to form a conductor receiving inlet at the back of said fanning plate.

11. A cable terminal box including a sealing chamber having a back wall or housing and a face plate, a fanning plate extending parallel with said face plate, a cover extending over the front of said fanning plate and face plate and having portions extending rearwardly beyond the side edges of the fanning plate and inwardly and forwardly to the back wall thereby cooperating with said back wall to guide said cover and form shielded spaces behind said fanning plate.

12. A cable terminal box embodying a sealing chamber, a face plate therefor, a fanning plate extending from opposite side edges of the face plate and substantially parallel with the face plate and a cover substantially enclosing said fanning plate.

13. A cable terminal box having a casing providing a sealing chamber open at the front, a face plate covering the front of the sealing chamber and having wiring terminals thereon, and a fanning plate cut out around the face plate and fastened to the front of the casing, said fanning plate having flanges at the top and bottom thereof projecting forwardly therefrom, the fanning plate being wider than the casing and having wire receiving apertures adjacent its vertical side edges in the portions extending beyond the side edges of the casing.

14. In a cable terminal box having a sealing chamber and a face plate therefor, said face plate having binding posts thereon, a fanning plate mountable on the front of said sealing chamber and cut out at the center to provide access to the binding posts, said fanning plate projecting beyond the sealing chamber at the sides and having wire receiving apertures adjacent its vertical side edges and forwardly extending flanges along its top and bottom edges, and a cover slidable over said fanning plate and covering both the front and back sides of the apertured sides of the fanning plate.

15. A cable terminal box having a sealing chamber casing of rust resisting cast iron, a face plate of insulating material for the front of said chamber, wiring terminals on said face plate, a sheet metal fanning plate centrally apertured to expose said wiring terminals and secured on said casing, said fanning plate projecting beyond the edges of the casing on all sides, and a sheet metal cover cooperating with said casing to cover projecting portions of said plate.

WALLACE L. COOK.